(12) United States Patent
Kim et al.

(10) Patent No.: US 11,353,926 B2
(45) Date of Patent: *Jun. 7, 2022

(54) ROLLABLE DISPLAY APPARATUS

(71) Applicant: SAMSUNG DISPLAY CO., LTD., Yongin-si (KR)

(72) Inventors: Kyoung Tae Kim, Osan-si (KR); Young Jin Lee, Suwon-si (KR); Sung Su Hong, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,559

(22) Filed: Sep. 10, 2020

(65) Prior Publication Data

US 2021/0004057 A1 Jan. 7, 2021

Related U.S. Application Data

(63) Continuation of application No. 15/621,431, filed on Jun. 13, 2017, now Pat. No. 10,775,848.

(30) Foreign Application Priority Data

Jun. 17, 2016 (KR) ........................ 10-2016-0076034

(51) Int. Cl.
*G06F 1/16* (2006.01)
*G09F 9/30* (2006.01)

(52) U.S. Cl.
CPC ............ *G06F 1/1652* (2013.01); *G09F 9/301* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 6,201,587 | B1 | 3/2001 | Sakamaki |
| 6,778,227 | B2 | 8/2004 | Sakamaki |
| 6,980,261 | B2 | 12/2005 | Sakamaki |
| 7,123,312 | B2 | 10/2006 | Sakamaki |

(Continued)

FOREIGN PATENT DOCUMENTS

| | | |
|---|---|---|
| CN | 101163163 | 4/2008 |
| CN | 104378936 | 2/2015 |

(Continued)

*Primary Examiner* — William Boddie
*Assistant Examiner* — Alecia D English
(74) *Attorney, Agent, or Firm* — F. Chau & Associates, LLC

(57) ABSTRACT

A rollable display apparatus including a main body portion extending in a length direction and including a metallic material. The rollable display apparatus further includes a flexible display panel protruding from an outer surface of the main body portion. A portion of the flexible display panel is connected to the main body portion. The rollable display apparatus additionally includes a support portion. The flexible display panel is attached to a first surface of the support portion, and the support portion includes an extension portion extending from the support portion and beyond an edge of the flexible display panel, and the extension portion includes a magnet that attaches the flexible display panel to the main body portion.

10 Claims, 14 Drawing Sheets

(56) References Cited

U.S. PATENT DOCUMENTS

| | | |
|---|---|---|
| 7,636,085 B2 | 12/2009 | Yang |
| 8,576,555 B2 | 11/2013 | Misawa |
| 8,665,044 B2 | 3/2014 | Lauder et al. |
| 10,223,942 B2 | 3/2019 | Chu |
| 2003/0179321 A1 | 9/2003 | Sakamaki |
| 2004/0183958 A1* | 9/2004 | Akiyama ............... G09F 9/30 349/58 |
| 2007/0002213 A1 | 1/2007 | Sakamaki |
| 2010/0064564 A1* | 3/2010 | Bemelmans .......... G06F 1/1615 40/607.01 |
| 2011/0043976 A1* | 2/2011 | Visser .................. G09F 9/301 361/679.01 |
| 2011/0227822 A1* | 9/2011 | Shai ..................... G06F 1/1641 345/156 |
| 2012/0194448 A1* | 8/2012 | Roth ..................... G06F 1/1616 345/173 |
| 2014/0098028 A1* | 4/2014 | Kwak ................... G06F 3/0488 345/173 |
| 2014/0160025 A1 | 6/2014 | Natarajan |
| 2015/0047796 A1 | 2/2015 | Peng et al. |
| 2015/0220119 A1* | 8/2015 | Seo ......................... G09F 9/301 345/173 |
| 2016/0132281 A1* | 5/2016 | Yamazaki ............ G06F 1/1624 345/1.3 |
| 2016/0254278 A1* | 9/2016 | Miyaguchi ............ H05K 1/028 257/72 |
| 2017/0003794 A1 | 1/2017 | Gao et al. |
| 2017/0123461 A1 | 5/2017 | Kim et al. |
| 2017/0154609 A1* | 6/2017 | Yoon ....................... G09G 5/38 |
| 2017/0194411 A1 | 7/2017 | Park et al. |
| 2017/0212556 A1 | 7/2017 | Jovanovic |
| 2017/0285688 A1* | 10/2017 | Sun ....................... G06F 1/1643 |
| 2017/0308126 A1 | 10/2017 | Yang |
| 2017/0364122 A1 | 12/2017 | Kim et al. |
| 2017/0374751 A1* | 12/2017 | Yang .................... G06F 1/1626 |
| 2018/0181233 A1* | 6/2018 | Li ......................... G06F 3/0445 |

FOREIGN PATENT DOCUMENTS

| | | |
|---|---|---|
| CN | 104732890 | 6/2015 |
| EP | 1394803 | 3/2004 |
| JP | 2009-085994 | 4/2009 |
| KR | 1020050085090 | 8/2005 |
| KR | 10-2014-0101611 | 8/2014 |
| KR | 10-1570869 | 11/2015 |

* cited by examiner

ROLLABLE DISPLAY APPARATUS

CROSS-REFERENCE TO RELATED APPLICATIONS

This application is a continuation of U.S. patent application Ser. No. 15/621,431 filed on Jun. 13, 2017, which claims priority under 35 U.S.C. § 119 to Korean Patent Application No. 10-2016-0076034 filed on Jun. 17, 2016 in the Korean Intellectual Property Office, the disclosures of which are incorporated by reference herein in their entireties.

TECHNICAL FIELD

One or more exemplary embodiments of the present inventive concept relate to a display apparatus, and more particularly, to a rollable display apparatus.

DISCUSSION OF THE RELATED ART

Since the development of portable electronic devices, such as smartphones, interest in display apparatuses that can provide convenience in portability and storage have also developed along with an interest in display apparatuses that are bigger in size and have high resolution. Accordingly, a display apparatus of which a screen can be expanded, and can be reduced in volume by being folded or rolled when being carried or stored, has been developed.

SUMMARY

According to an exemplary embodiment of the present inventive concept, a rollable display apparatus including a main body portion extending in a length direction and including a metallic material. The rollable display apparatus further includes a flexible display panel protruding from an outer surface of the main body portion. A portion of the flexible display panel is connected to the main body portion. The rollable display apparatus additionally includes a support portion. The flexible display panel is attached to a first surface of the support portion, and the support portion includes an extension portion extending from the support portion and beyond an edge of the flexible display panel, and the extension portion includes a magnet that attaches the flexible display panel to the main body portion.

According to an exemplary embodiment of the present inventive concept, a rollable display apparatus including a flexible display panel. The rollable display apparatus further includes a main body portion including a metallic material and a through-hole that extends in a length direction of the main body portion so that the flexible display panel penetrates therethrough, and having a column shape extending in the length direction. The rollable display apparatus additionally includes a roller disposed in the main body portion, to receive the flexible display panel spirally wind through the through-hole. The flexible display panel is attached to a surface of a support portion; the support portion includes an extension portion extending from the support portion and beyond an edge of the flexible display. The edge of the flexible display panel extends along the length direction of the main body portion. The extension portion includes a magnet that attaches the flexible display panel to the main body portion.

According to an exemplary embodiment of the present inventive concept, a rollable display apparatus including a main body portion and a flexible display panel connected to the main body portion. The rollable display apparatus further includes a plurality of support portions. The flexible display panel is attached to a first surface of each support portion of the plurality of support portions. A thickness of each support portion is less than a thickness of the main body portion. The rollable display apparatus additionally includes a joint portion disposed between each support portion of the plurality of support portions.

DETAILED DESCRIPTION OF THE EMBODIMENTS

Figure 1:
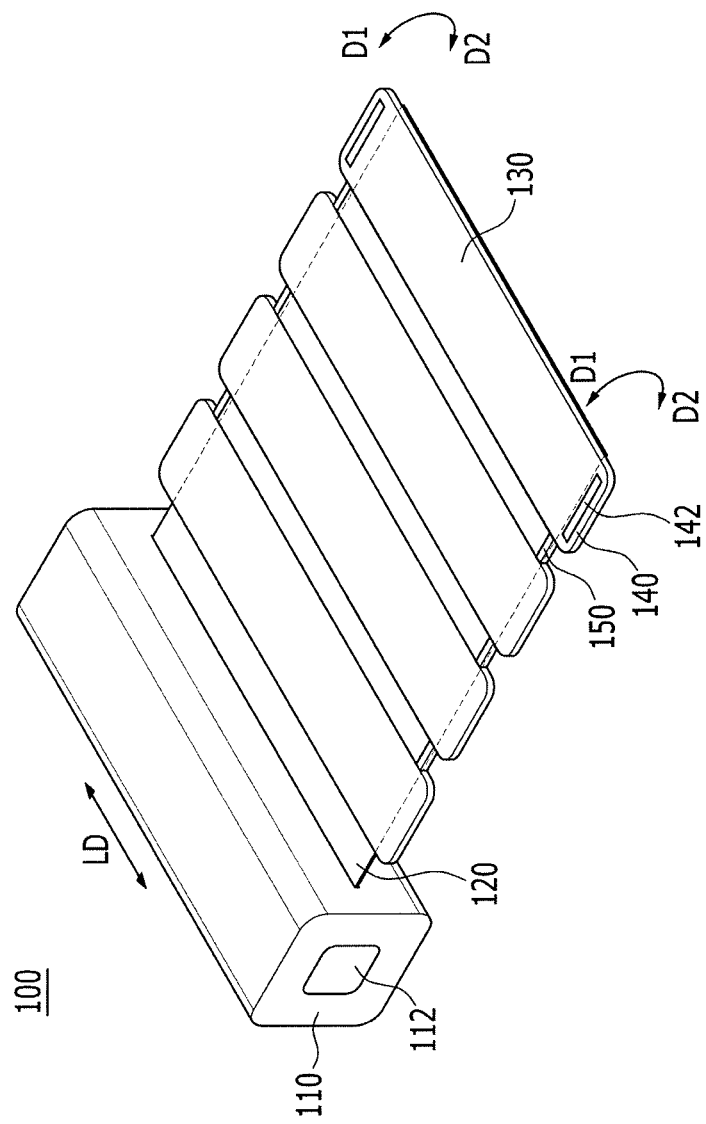
FIG. 1 schematically illustrates a rollable display apparatus according to an exemplary embodiment of the present inventive concept.

Exemplary embodiments of the present inventive concept will be described more fully hereinafter with reference to the accompanying drawings.

The drawings and description are to be regarded as illustrative in nature and not restrictive. Reference numerals that are similar or identical may designate similar or identical elements or features throughout the specification and drawings.

In the drawings, the thickness of layers, films, panels, regions, etc., may be exaggerated for clarity. In addition, in the drawings, for better understanding and ease of description, the thickness of some layers and areas may be exaggerated. It will be understood that when an element such as a layer, film, region, or substrate is referred to as being "on" another element, it may be directly on the other element or intervening elements may also be present.

Figure 2:
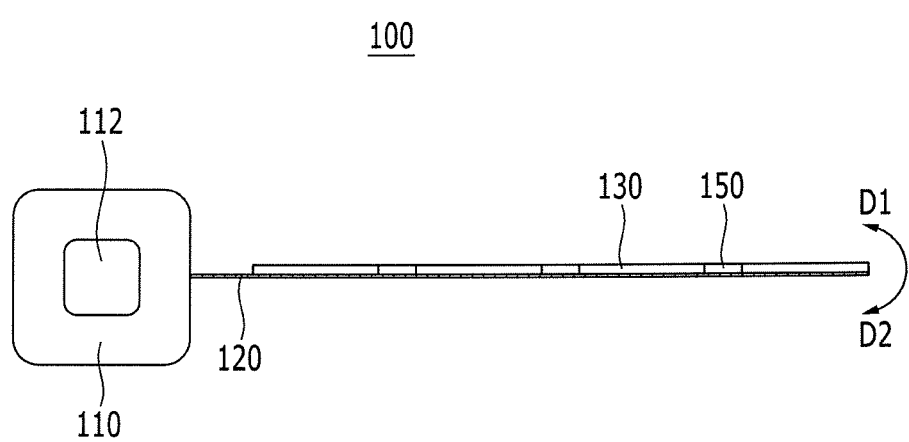
FIG. 2 is a side view of the rollable display apparatus of FIG. 1.

FIG. 1 schematically illustrates a rollable display apparatus 100 according to an exemplary embodiment of the present inventive concept, and FIG. 2 is a side view of the rollable display apparatus 100 of FIG. 1. Further, a side view may be a view from a direction that is parallel with a length direction LD of a main body portion 110.

As shown in FIG. 1 and FIG. 2, the rollable display apparatus 100 of an exemplary embodiment of the present inventive concept includes a main body portion 110, a flexible display panel 120, a support portion 130, and an extension portion 140.

The main body portion 110 may include a power source portion and a controller, and supplies power to the flexible display panel 120 and controls an image or a video to be displayed on the flexible display panel 120.

The main body portion 110 is formed in the shape of a column that is extended in the length direction LD. For example, the main body portion 110 could have a cylindrical shape or polygonal shape. However, exemplary embodiments of the present inventive concept are not limited thereto. The flexible display panel 120 is spirally wound around the main body portion 110 and then mounted on an exterior surface of the main body portion 110. In this case, a cross-section of the main body portion 110, perpendicular to the length direction LD of the main body portion 110, may have a polygonal shape of which corners are rounded. For example, the main body portion 110 may have a shape of a quadrangle of which corners are rounded as shown in FIG. 1 and FIG. 2.

A fingerprint input portion 112 that receives a fingerprint of a user and controls power or operation of the rollable display apparatus may be included in one end side or lateral sides of the main body portion 110. The fingerprint input portion 112 may scan an input fingerprint of the user and compare the scanned fingerprint with a predetermined fingerprint. When the two fingerprints are determined to be the same, it generates an electric signal that is transmitted to the power source portion and the controller for driving the rollable display apparatus 100.

The flexible display panel 120 extends by protruding from an exterior surface of the main body portion 110, and may be mounted on the exterior surface of the main body portion 110 by being spirally wound around the exterior surface of the main body portion 110. For example, a portion of the flexible display panel 120 may be inside the main body portion 110 and fixed to the inside thereof. For example, the spiral winding of the flexible display panel 120 may be manually performed by the user, or may be automatically performed by using a mechanical configuration.

The flexible display panel 120 may be mounted on the exterior surface of the main body portion 110 when spirally wound as described above, and the flexible display panel 120 may be fixed to the main body portion 110 by a magnet 142 of the extension portion 140. This will be described in detail later.

The flexible display panel 120 according to an exemplary embodiment of the present inventive concept may be a display panel including an organic light emitting display element, but exemplary embodiments of the present inventive concept are not limited thereto. For example, the flexible display panel 120 may include a liquid crystal display and display elements that are typically used for displaying an image.

Figure 3:
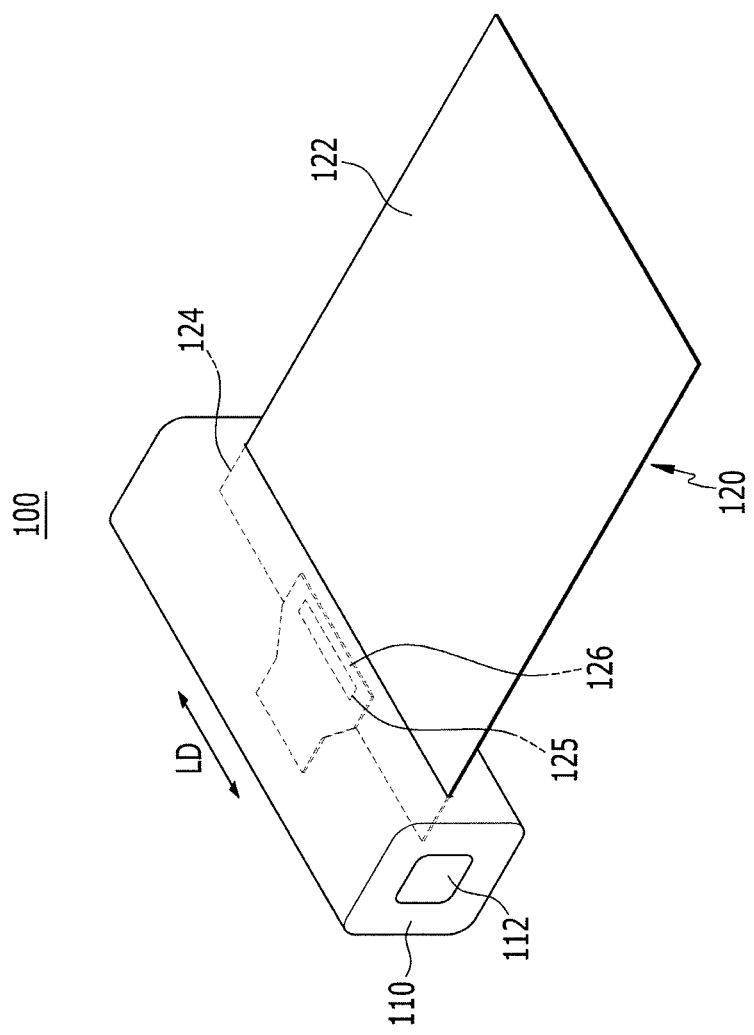
FIG. 3 schematically shows the flexible display panel of the rollable display apparatus of FIG. 1, being combined with a main body portion.

FIG. 3 schematically illustrates a state in which the flexible display panel 120 of the rollable display apparatus 100 of FIG. 1 is combined with the main body portion 110. As shown in FIG. 3, the flexible display panel 120 extends beyond the main body portion 110 by protruding from the exterior surface of the main body portion 110. For example, an end of the flexible display panel 120 may be attached to the main body portion 110. In the flexible display panel 120, a display area 122 where an image is displayed is exposed to an outside of the main body portion 110 such that visual information of the image can be displayed to the user. In addition, to transmit power and an electric signal transmitted from the power source portion and the controller of the main body portion 110 to the display area 122, a peripheral area 124 that includes configurations such as a driving circuit chip 125 and a flexible printed circuit board 126 may be disposed in the main body portion 110.

The flexible display panel 120 is attached to a surface of the support portion 130 (e.g., as shown in FIG. 1) to support the flexible display panel 120 when the flexible display panel 120 is unrolled from the main body portion 110. Further, the support portion 130 may have a rectangular shape with rounded corners or sharp corners. For example, the flexible display panel 120 may be disposed on the support portion 130.

In an exemplary embodiment of the present inventive concept, the support portion 130 may be formed of a material with a rigidity stronger than that of the flexible display panel 120, such as a metallic material. Further, the support portion 130 may be formed of a flexible material that has a stronger rigidity than that of the flexible display panel 120. However, exemplary embodiments of the present inventive concept are not limited thereto.

Since the support portion 130 has stronger rigidity than that of the flexible display panel 120, the flexible display panel 120 can be fixed in a flat position after being unrolled as shown in FIG. 2 if the flexible display panel 120 is supported by the support portion 130. Thus, the user can view an image on the display area 122 of the flexible display panel 120 without distortion, and a touch-type signal input can be accurately received and a corresponding response to the touch input can be effectively performed.

The extension portion 140 (e.g., refer to FIG. 1) is a portion that extends from the support portion 130 and beyond an adjacent edge of the flexible display panel 120, and is integrally formed with the support portion 130. For example, the extension portion 140 may extend beyond an edge, which extends in a direction perpendicular to length direction LD, of the flexible display panel 120. However, exemplary embodiments of the present inventive concept are not limited thereto. For example, an extension portion 140 of a support portion 130 furthest from the main body portion 110 may extend beyond an edge of the flexible display panel 120 that extends in the length direction LD. The extension portion 140 may include a magnet 142, and when the flexible display panel 120 is being spirally wound around the main body portion 110, the flexible display panel 120 can be fixed to the main body portion 110 by a magnetic force of the magnet 142. Thus, the main body portion 110, according to an exemplary embodiment of the present inventive concept, may include a metallic material so as to fix the flexible display panel 120 to the main body portion 110 by using the magnet 142.

According to an exemplary embodiment of the present inventive concept, there may be a plurality of the support portions 130 and, accordingly, a plurality of the extension portions 140 as shown in FIG. 1 and FIG. 2. The number of support portions 130 and extension portions 140 may vary depending on a length of the flexible display panel 120 that is spirally wound around the main body portion 110, the shape and size of the main body portion 110, the shape of spirally-wound flexible display panel 120, or a method for spirally-winding the flexible display panel 120. Accordingly, one support portion 130 may include one extension portion 140, and a number of pairs of support portions 130 and extension portions 140 may be greater than or less than four pairs of support portions 130 and extension portions 140 shown in FIG. 1 and FIG. 2.

Further, in an exemplary embodiment of the present inventive concept, a magnet 142 may be disposed in an extension portion 140 or in a plurality of extension portions 140.

Figure 4:
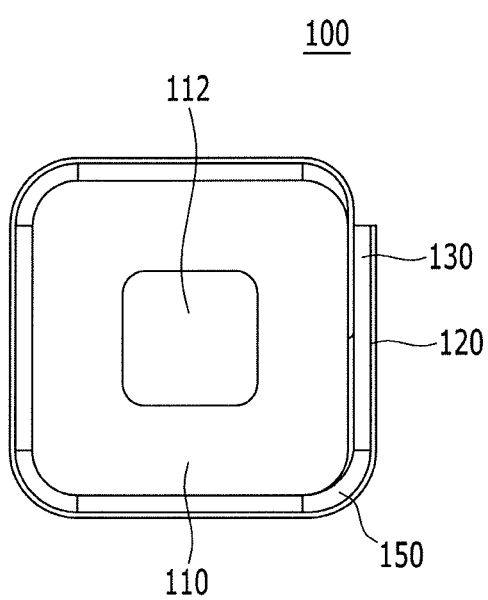
FIG. 4 is a side view of the rollable display panel of the rollable display apparatus of FIG. 2, spirally wound along a first direction.
Figure 5:
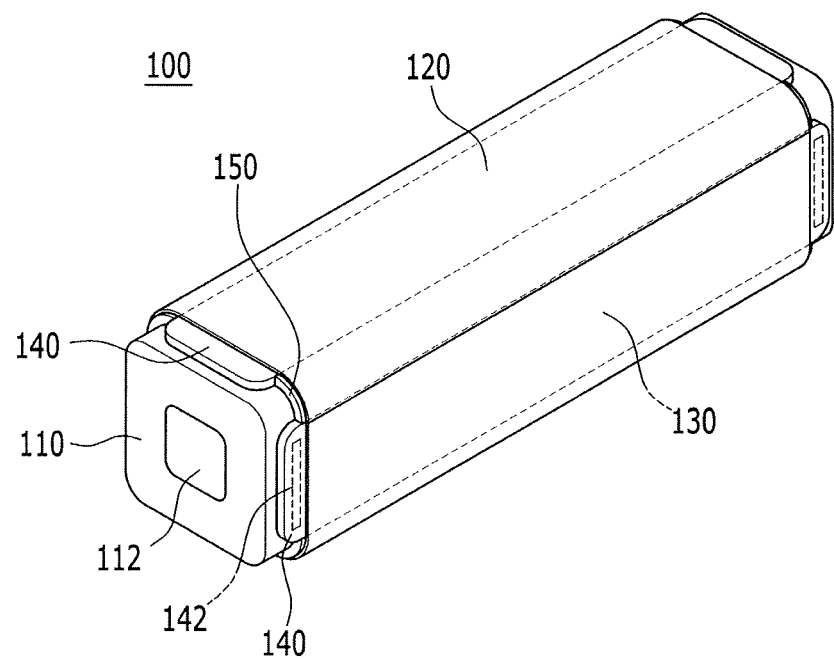
FIG. 5 is a perspective view of the rollable display apparatus of FIG. 4.

FIG. 4 and FIG. 5 illustrate a state where the flexible display panel 120 according to an exemplary embodiment of the present inventive concept is spirally wound around the main body portion 110 and, thus, fixed thereto. For example, FIG. 4 shows a state where the flexible display panel 120 of the rollable display apparatus 100 of FIG. 2 is spirally wound along a first direction D1 (e.g., refer to FIG. 1 and FIG. 2), which is viewed from a direction that is parallel with the length direction LD of the main body portion 110, and FIG. 5 is a perspective view of the rollable display apparatus 100 of FIG. 4 in the spirally wound state.

As shown in FIG. 4 and FIG. 5, when the flexible display panel 120 according to an exemplary embodiment of the present inventive concept is spirally wound around the outer surface of the main body portion 110 along the first direction D1, an end portion of the flexible display panel 120 can be fixed to the outer surface of the main body portion 110 by the magnet 142 included in the extension portion 140. For example, an extension portion 140 including the magnet 142 and furthest from the main body portion 110 may fix the flexible display panel 120 to the outer surface of the main body portion 110.

In FIG. 4 and FIG. 5, the flexible display panel 120 according to an exemplary embodiment of the present inventive concept is spirally wound around the surface of the main body portion 110 along the first direction D1, but exemplary embodiments of the present inventive concept are not limited thereto. The flexible display panel 120 according to an exemplary embodiment of the present inventive concept can be spirally wound around the main body portion 110 in opposite directions, and thus, the flexible display panel 120 can be spirally wound around the outer surface of the main body portion 110 along a second direction D2 (e.g., refer to FIG. 1 and FIG. 2). For example, the first direction D1 may be a counterclockwise direction with respect to the main body portion 110, and the second direction D2 may be a clockwise direction with respect to the main body portion 110.

When the flexible display panel 120 is spirally wound around the main body portion 110 along the first direction D1, a portion of the flexible display panel 120 is exposed to the outer surface of the main body portion 110, and the remaining portion of the flexible display panel 120 and the display area 122 are exposed to the outside of the main body portion 110 while the flexible display panel 120 is being spirally wound around the main body portion 110. However, when the flexible display panel 120 is spirally wound along the second direction D2, the support portion 130 rather than the flexible display panel 120 is exposed to the outside such that the flexible display panel 120 may be protected. The user can select a spiral winding direction of the flexible display panel 120.

Joint portions 160 are disposed between each support portion 130 of the plurality of support portions 130. The joint portion 150 is disposed between the support portions 130 having rigidity to assist the spiral winding of the flexible display panel 120.

Figure 6:
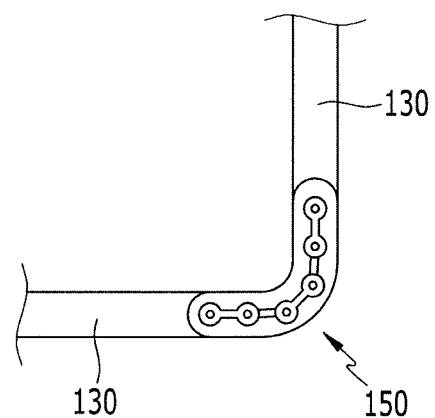
FIG. 6 schematically illustrates a part of a flexible display panel of the rollable display apparatus, spirally wound by a joint portion according to an exemplary embodiment of the present inventive concept.
Figure 7:
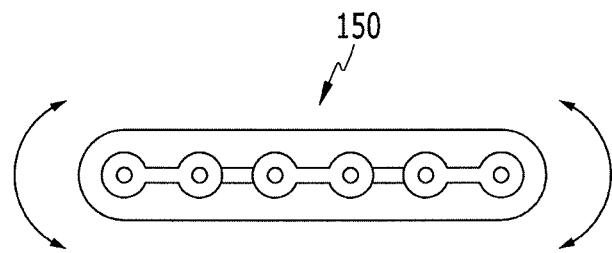
FIG. 7 illustrates the joint portion of FIG. 6.

FIG. 6 and FIG. 7 schematically illustrate the joint portion 150 according to an exemplary embodiment of the present inventive concept. FIG. 6 schematically illustrates a part of the spirally-wound flexible display panel 120 of the rollable display apparatus 100 by the joint portion 150 in a bent position, and FIG. 7 shows the joint portion 150 in an unrolled state (e.g., a flat position).

As shown in FIG. 6 and FIG. 7, the joint portion 150 according to an exemplary embodiment of the present inventive concept has a multi-joint structure, and thus, the joint portion 150 can be bent in the first direction D1 or the second direction D2. In addition, once the flexible display panel 120 is completely unrolled and in a substantially flat position, the flexible display panel 120 may be fixed so as to not be bent further, and when the flexible display panel 120 is being spirally wound again after being unrolled, the fixing is released so that the joint portion 150 can be bent in the first direction D1 or the second direction D2. In an exemplary embodiment of the present inventive concept, the joint portion 150 may be locked when spirally wound around the main body portion 110.

In an exemplary embodiment of the present inventive concept, a joint portion 150 may include a locking mechanism that locks the joint portion 150 when in an unrolled state. When a force (e.g., a force greater than a force resulting from a touch input) is applied to the flexible display panel 120 in the first direction D1 or the second D2, the locking mechanism may be unlocked and the flexible display panel 120 may be spirally-wound around the main body portion 110. However, exemplary embodiments of the present inventive concept are not limited to this locking method and arrangement.

Figure 8:
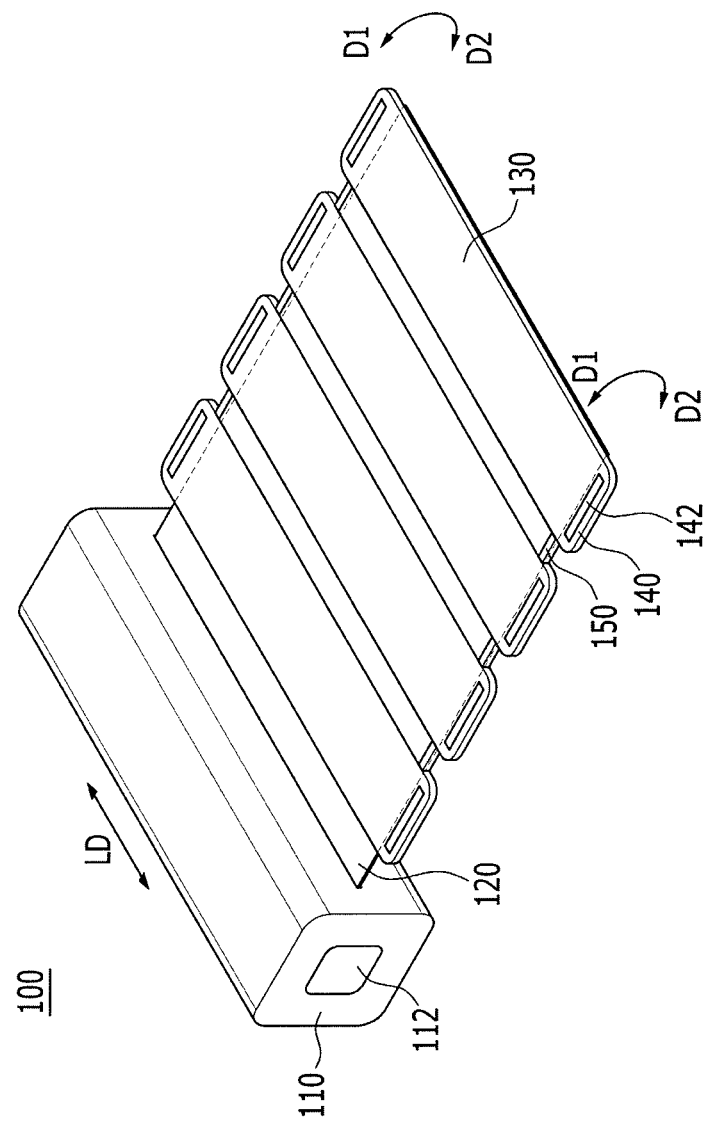
FIG. 8 schematically illustrates a rollable display apparatus according to an exemplary embodiment of the present inventive concept.
Figure 9:
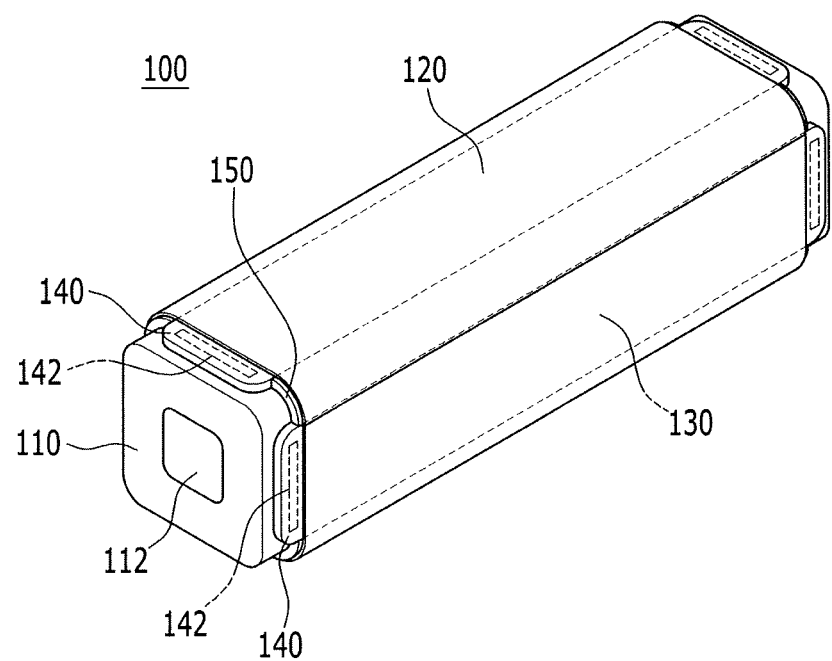
FIG. 9 is a schematic perspective view of a flexible display panel of the rollable display apparatus of FIG. 8, spirally wound along a first direction.

FIG. 8 schematically illustrates a rollable display apparatus 100 according to an exemplary embodiment of the present inventive concept, and FIG. 9 is a schematic perspective view of a flexible display panel 120 of the rollable display apparatus 100 of FIG. 8, spirally wound along a first direction D1. As shown in FIG. 8 and FIG. 9, the rollable display apparatus 100 according to an exemplary embodiment of the present inventive concept includes a plurality of magnets 142 disposed in a plurality of extension portions 140.

According to an exemplary embodiment of the present inventive concept, each magnet 142 of the plurality of magnets 142 is disposed in each extension portion 140 of the plurality of extension portions 140, and thus, the flexible display panel 120 can be firmly fixed when being spirally wound around a main body portion 110. However, exemplary embodiments of the present inventive concept are not limited thereto. For example, extension portions 140 nearest the main body portion 110 and extension portions furthest from the main body portion 110 may each include a magnet 142.

Figure 10:
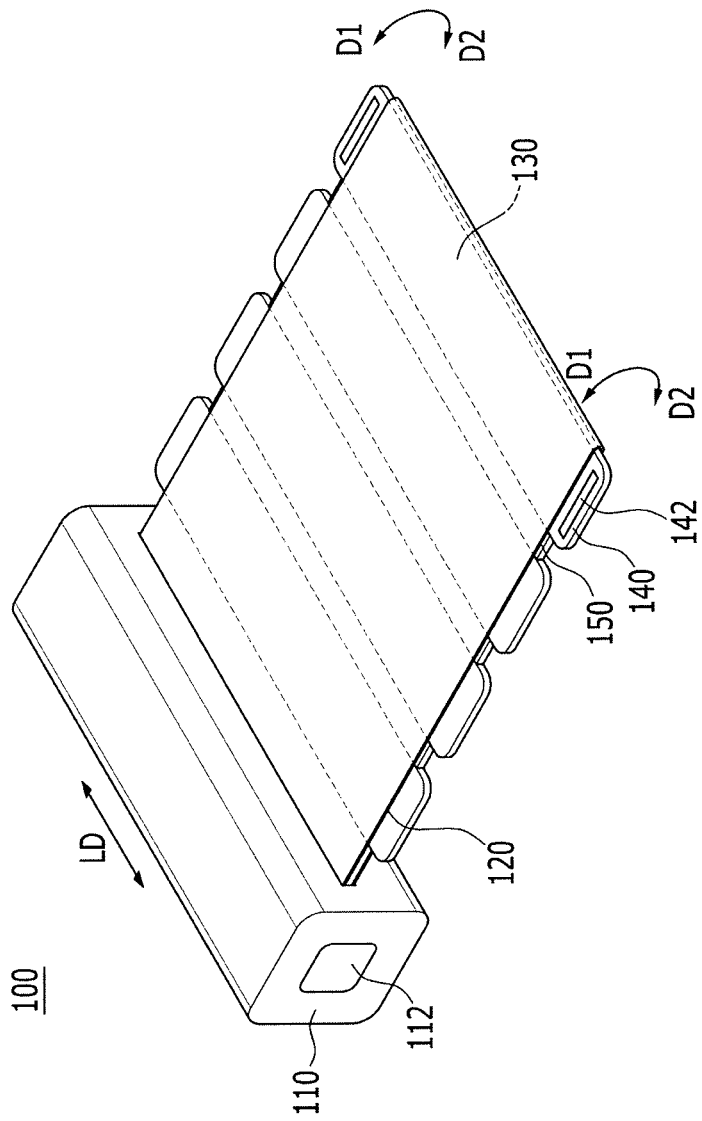
FIG. 10 schematically illustrates a rollable display apparatus according to an exemplary embodiment of the present inventive concept.
Figure 11:
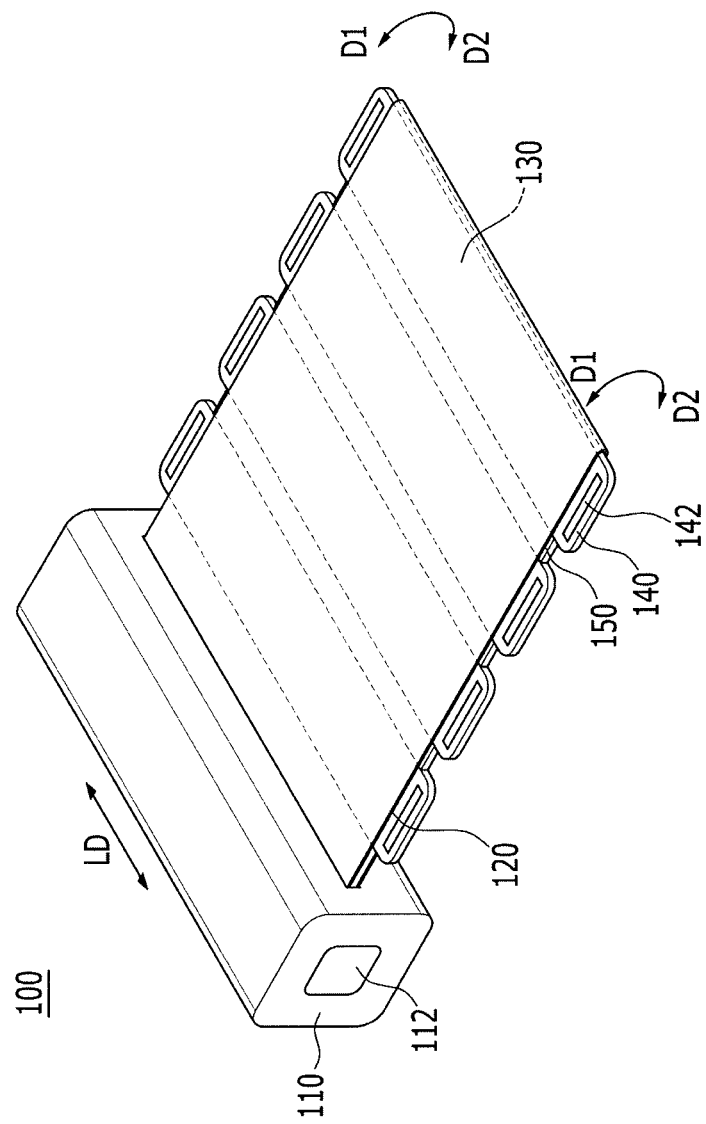
FIG. 11 schematically illustrates a rollable display apparatus according to an exemplary embodiment of the present inventive concept.

FIG. 10 shows a rollable display apparatus 100 according to an exemplary embodiment of the present inventive concept, and FIG. 11 shows a rollable display apparatus 100 according to an exemplary embodiment of the present inventive concept.

As shown in FIG. 10 and FIG. 11, in the rollable display apparatuses 100 according to an exemplary embodiment of the present inventive concept, a flexible display panel 120 is extended, wrapped around an edge furthest from the main body portion 110, which extends in the length direction LD, of a support portion furthest from the main body portion 110. Further, the flexible display panel 120 is attached to a bottom surface of support portions 130, and connected to the main body portion 110. In other words, the upper surface and bottom surface of the support portion 130 are covered by the flexible display panel 120.

In an exemplary embodiment of the present inventive concept shown in FIG. 10, one pair of magnets 142 are disposed only in extension portions 140 of the support portion 130 furthest from the main body portion 110 among the plurality of support portions 130, and in an exemplary embodiment of the present inventive concept shown in FIG. 11, the magnet 142 is disposed in each extension portion 140 respectively included in the plurality of support portions 130.

Figure 12:
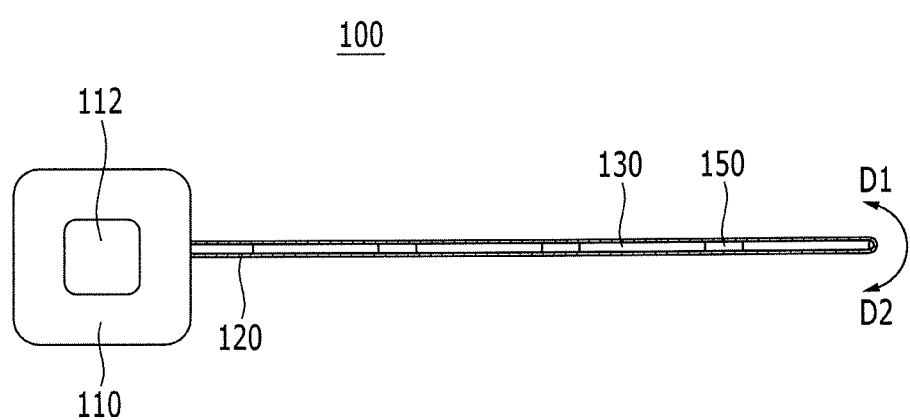
FIG. 12 is a side view of a flexible display panel of the rollable display apparatus of FIG. 10 or FIG. 11.

FIG. 12 illustrates a flexible display panel 120 of the rollable display apparatus 100 of FIG. 10 or FIG. 11 viewed from a direction that is parallel with a length direction LD of the main body portion. When the flexible display panel 120 of the rollable display apparatus 100 according to an exemplary embodiment of the present inventive concept is unrolled as shown in FIG. 12, the same image or different images may be displayed on both sides of the flexible display panel 120. Alternatively, a screen may be disposed only on one side of the flexible display panel 120.

Further, the flexible display panel 120 may be spirally wound along the first direction D1 or the second direction D2. For example, the flexible display panel 120 can be spirally wound along either the first or second direction D1 and D2, and the direction can be selected by a user.

Figure 13:
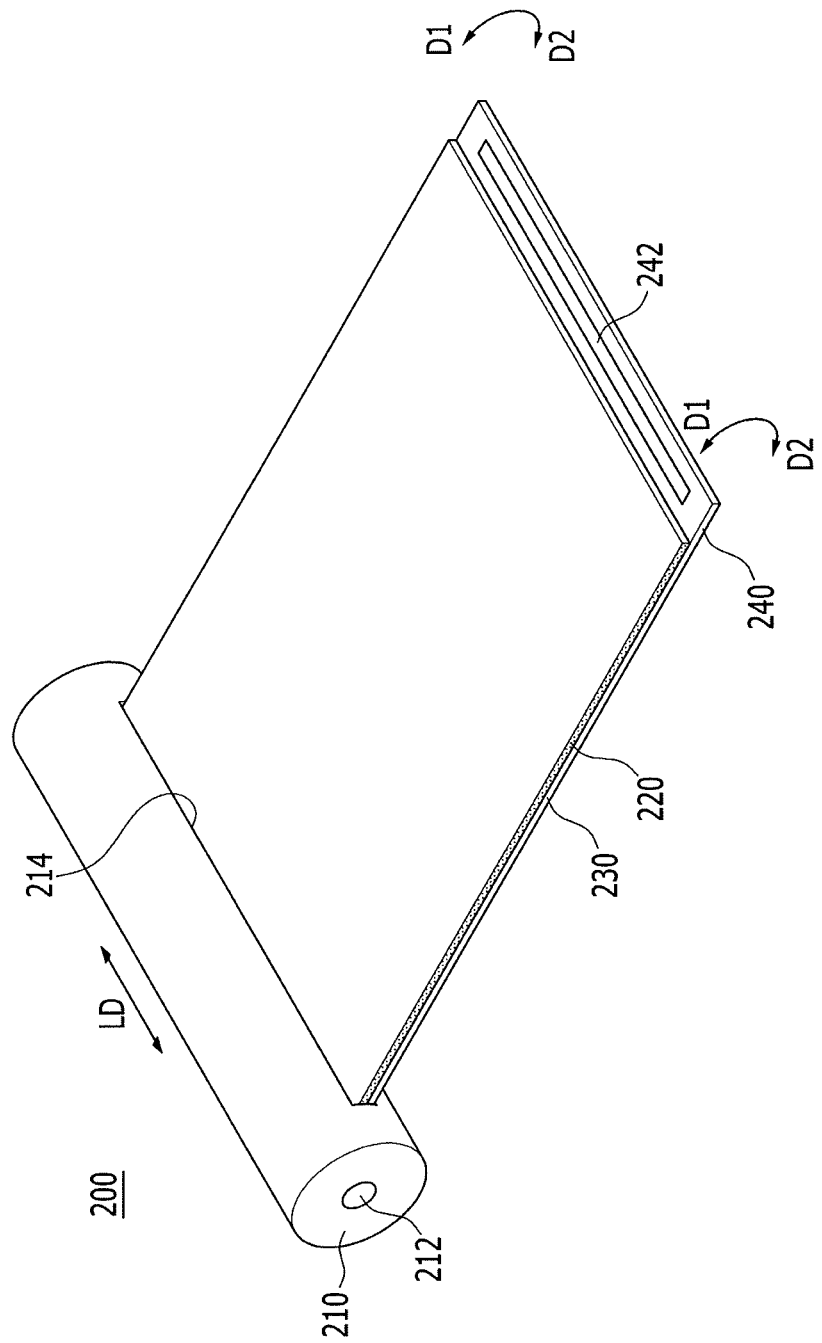
FIG. 13 schematically illustrates a rollable display apparatus according to an exemplary embodiment of the present inventive concept.
Figure 14:
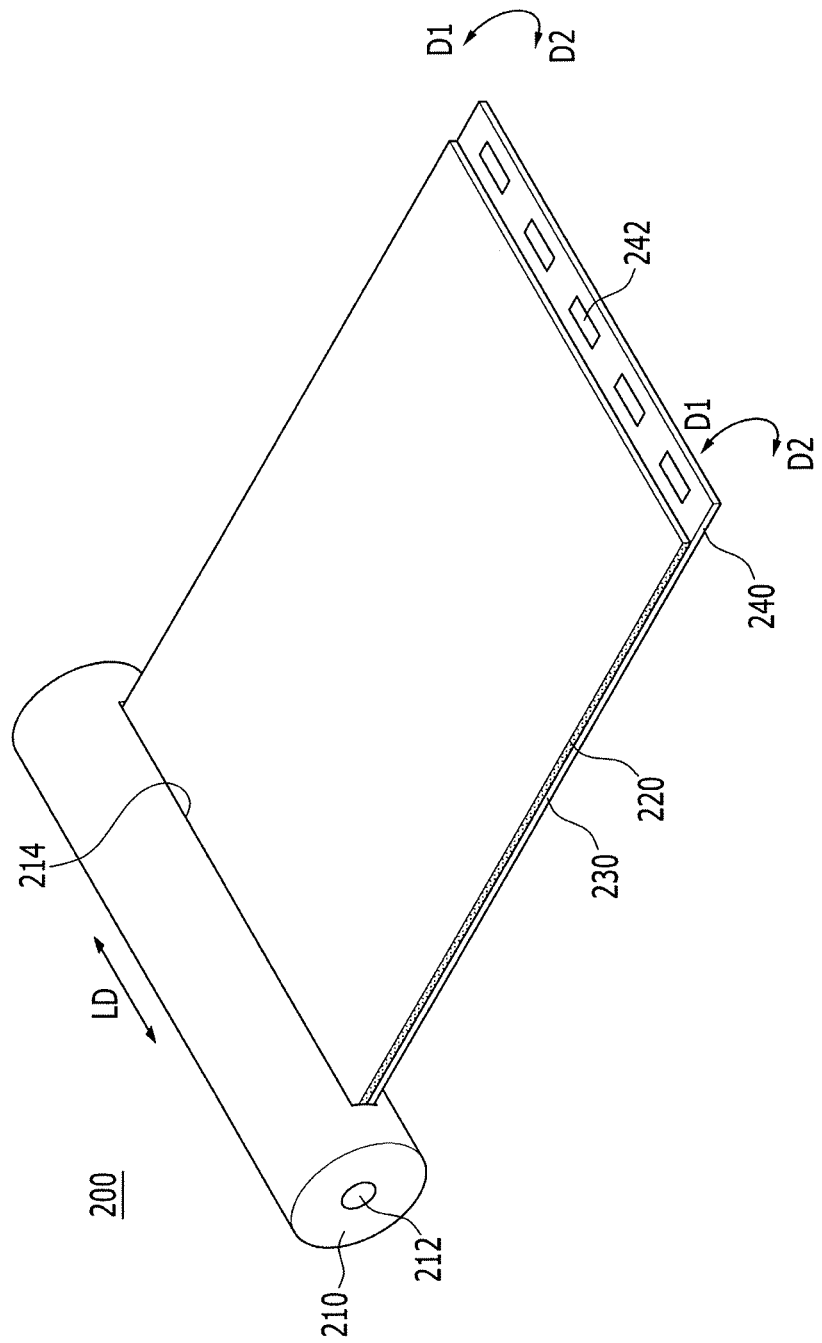
FIG. 14 schematically illustrates a rollable display apparatus according to an exemplary embodiment of the present inventive concept.
Figure 15:
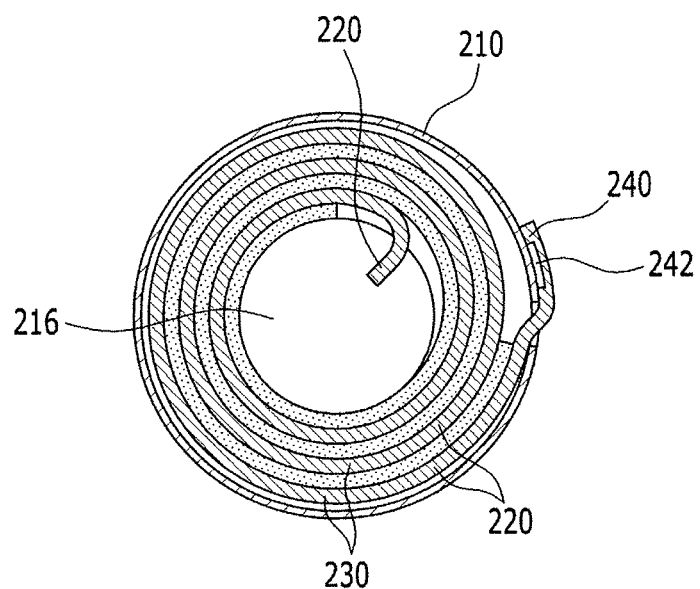
FIG. 15 schematically illustrates a flexible display panel of the rollable display apparatus of FIG. 13 or FIG. 14, spirally wound along a first direction.

FIG. 13 to FIG. 15 illustrate rollable display apparatuses 200 that are different from the above-described rollable display apparatuses in shape. FIG. 13 schematically illustrates a rollable display apparatus 200 according to an exemplary embodiment of the present inventive concept, FIG. 14 schematically illustrates a rollable display apparatus 200 according to an exemplary embodiment of the present inventive concept, and FIG. 15 is a cross-sectional view of a flexible display panel 220 of the rollable display apparatus 200 of FIG. 14, spirally wound along a first direction D1.

As shown in FIG. 13 to FIG. 15, the rollable display apparatus 200 according to an exemplary embodiment of the present inventive concept includes a main body portion 210, a flexible display panel 220, a support portion 230, and an extension portion 240. In an exemplary embodiment of the present inventive concept, portions that have been described in above-stated exemplary embodiments of the present inventive concept will not be further described.

The main body portion 210 according to an exemplary embodiment of the present inventive concept may include a through-hole 214 extending along a length direction LD and through which the flexible display panel 220 may penetrate. Further, the main body portion 210 may have a column shape that extends in the length direction LD.

As shown in FIG. 13 and FIG. 14, the support portion 230 is disposed on one side of the flexible display panel 220, and a magnet 242 may be disposed in the extension portion 240 extended to the outside of an edge of the flexible display panel 220 from the support portion 230 as described above. For example, the extension portion 240 may extend to the outside of an edge of the flexible display panel 220 that extends in the length direction LD. However, exemplary embodiments of the present inventive concept are not limited thereto.

One magnet 242 may be extended in the length direction LD according to an exemplary embodiment of the present inventive concept, or a plurality of magnets 242 may be disposed at substantially regular intervals along the length direction LD according to an exemplary embodiment of the present inventive concept.

A roller 216 is disposed in the main body portion 210, and the roller 216 rotates to spirally wind the flexible display panel 220. As shown in FIG. 15, the flexible display panel 220 spirally wound by rotation of the roller 216 may be received in the main body portion 210 and, thus, stored therein.

Although FIG. 13 to FIG. 15 illustrate exemplary embodiments of the present inventive concept in which the flexible display panel 220 is received in the main body portion 210, the exemplary embodiments of the present inventive concept are not limited thereto. The flexible display panel 220 may be spirally wound around the surface of the main body portion 210 as described in exemplary embodiments of the present inventive concept.

The flexible display panel 220 according to an exemplary embodiment of the present inventive concept can be spirally wound along either the first direction D1 or the second direction D2 depending on the rotation direction of the roller 216. Referring to FIG. 13 to FIG. 15, a cross-section of the main body portion 210 according to an exemplary embodiment of the present inventive concept, which is perpendicular to the length direction LD of the main body portion 210, may have a circular or oval shape so as to spirally wind the flexible display panel 220 by the rotation of the roller 216.

The main body portion 210 according to an exemplary embodiment of the present inventive concept includes a fingerprint input portion 212 that controls power and driving of a rollable display apparatus 200 by receiving a fingerprint of a user. Further, the main body portion 210 may further include a power source and a controller as in previously described exemplary embodiments of the present inventive concept. Further, the flexible display panel 220 additionally includes a display area and a peripheral area, and a driving circuit chip and a printed circuit board disposed in the peripheral area that may be connected to the power source and the controller of the main body portion 210 as in previously described exemplary embodiments of the present inventive concept.

Hereinabove, the rollable display apparatuses 100 and 200 according to exemplary embodiments of the present inventive concept have been described. According to exemplary embodiments of the present inventive concept, the rollable display apparatuses 100 and 200 in which spiral-winding and spiral-drawing out of the flexible display panels 120 and 220 can be performed. Further, the support portions 130 and 230 may enhance screen display and touch input when the flexible display panels 120 and 220 are drawn out (e.g., in a flat position). Additionally, a drawing out direction can be determined depending on a user's preference, and the flexible display panels 120 and 220 can be firmly fixed.

While the present inventive concept has been particularly shown and described with reference to exemplary embodiments thereof, it will be apparent to those of ordinary skill in the art that various changes in form and detail may be made thereto without departing from the spirit and scope of the present inventive concept as defined by the following claims.

What is claimed is:

1. A flexible display apparatus comprising:
a main body portion extending in a first direction;
a flexible display panel protruding from an outer surface of the main body portion, and including a first edge and a second edge which is opposite the first edge, wherein a first end of the flexible display panel is connected to the main body portion;
a plurality of support portions extending in the first direction, wherein the plurality of support portions is attached to a bottom surface of the flexible display panel; and
a plurality of multi-joint portions connecting two support portions disposed nearby,
wherein the plurality of multi-joint portions are configured to bend in a third direction and a fourth direction opposite to the third direction such that the flexible display panel is configured to wind around the main body portion in the third direction, exposing an upper surface of the flexible display panel, and to wind around the main body portion in the fourth direction, exposing the bottom surface of the flexible display panel,
wherein the flexible display panel is disposed on a first surface of each of the plurality of multi-joint portions and a second surface, opposite to the first surface, of each of the plurality of multi-joint portions.

2. The flexible display apparatus of claim 1, wherein there is a plurality of extension portions, and the plurality of extension portions are respectively included in each of the plurality of support portions.

3. The flexible display apparatus of claim 2, wherein there is a plurality of magnets, and the plurality of magnets are respectively disposed in each of the plurality of extension portions.

4. The flexible display apparatus of claim 1, wherein each of the support portions includes an extension portion extending from each of the support portions and beyond the first edge or the second edge of the flexible display panel, and the extension portion includes a magnet that attaches the flexible display panel to the main body portion,
wherein the flexible display panel is mounted on the outer surface of the main body portion when the flexible display panel is spirally wound.

5. The flexible display apparatus of claim 1, wherein the main body portion further comprises a fingerprint scanner to scan a fingerprint of a user and to control power of the flexible display apparatus.

6. The flexible display apparatus of claim 1, wherein a cross-section of the main body portion, which is perpendicular to the first direction of the main body portion, has a polygonal shape having rounded corners.

7. The flexible display apparatus of claim 1, wherein the main body portion comprises a power source portion and a controller, and
the flexible display panel comprises:
a display area for displaying an image; and
a peripheral area that includes a driving circuit chip and a flexible printed circuit board for supplying power from the power source portion and an electric signal from the controller to the display area, and is disposed in the main body portion.

8. The flexible display apparatus of claim 1, wherein each of the support portions has stronger rigidity than that of the flexible display panel.

9. The flexible display apparatus of claim 1, wherein the plurality of support portions do not directly contact each other.

10. The flexible display apparatus of claim 1, wherein each of the multi-joint portions extends from the first edge to the second edge along the first direction.

* * * * *